United States Patent Office 2,750,955
Patented June 19, 1956

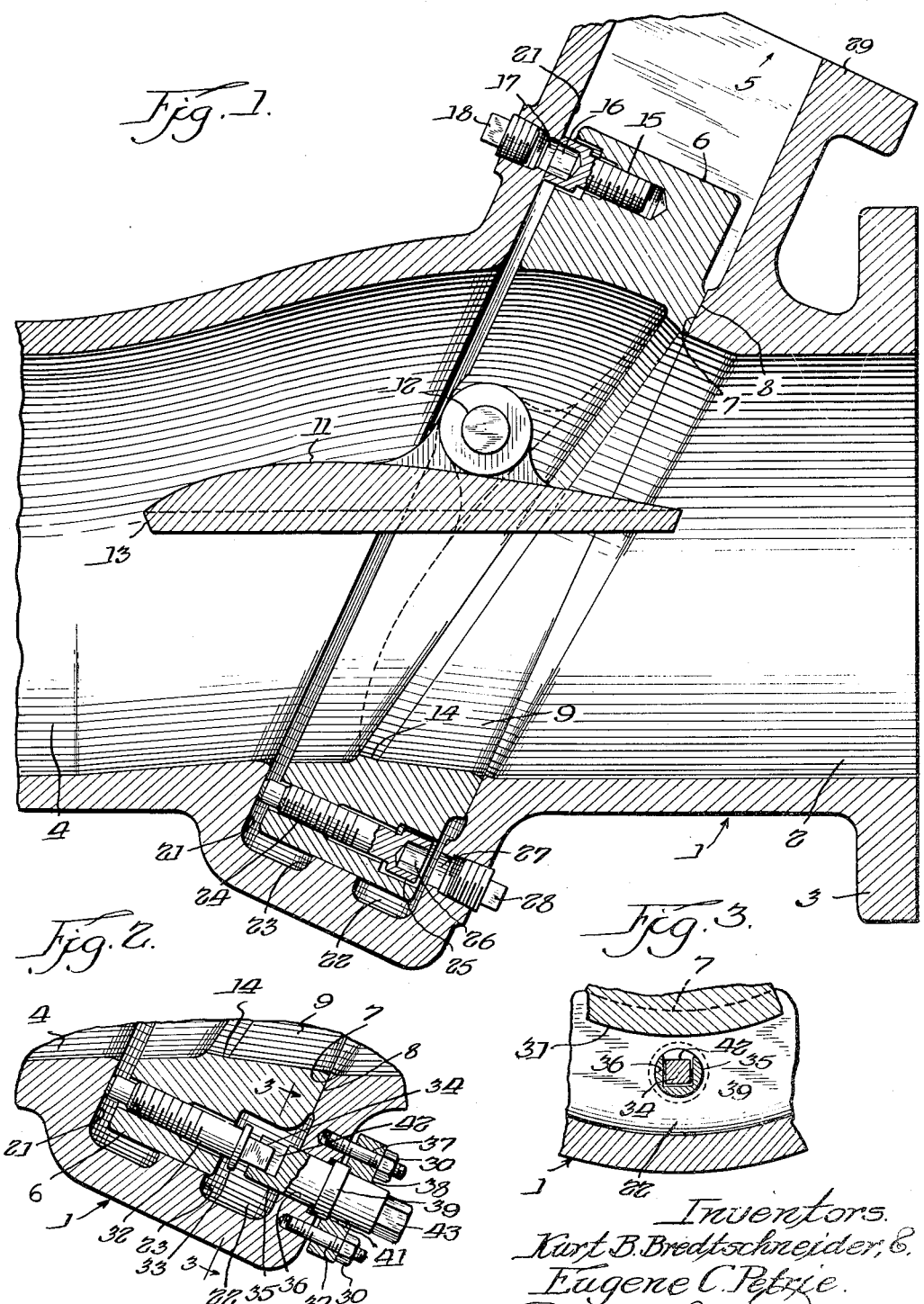

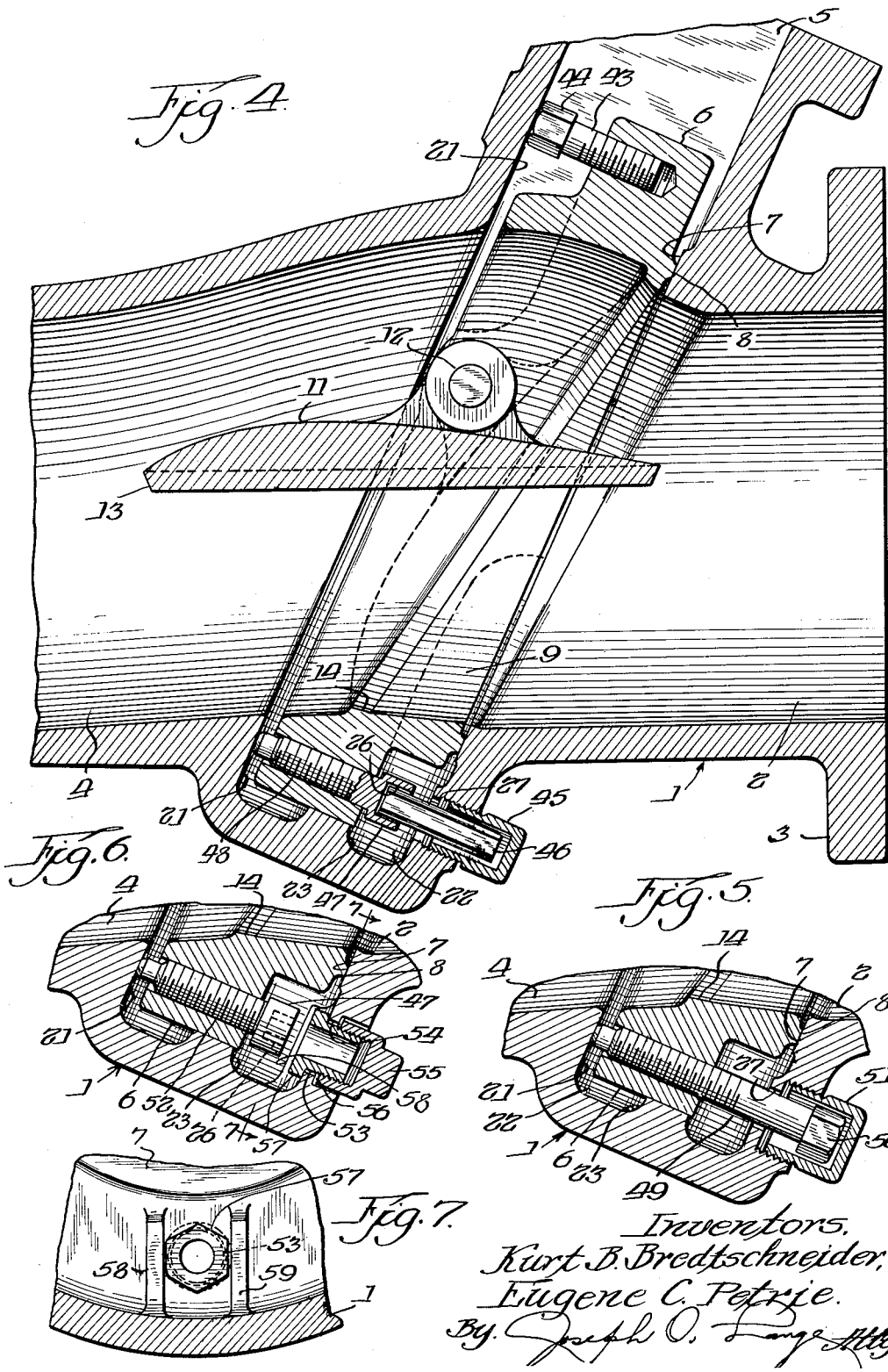

2,750,955

VALVE SEAT MOUNTING

Kurt B. Bredtschneider, Chicago, and Eugene C. Petrie, Elmhurst, Ill., assignors to Crane Co., Chicago, Ill., a corporation of Illinois Application January 24, 1952, Serial No. 268,048

3 Claims. (Cl. 137—454.2)

This invention relates to a novel seat mounting for valves, and, more particularly, it is concerned with what is known to those skilled in the art as a tilting disc type valve having a removable seat.

Heretofore, one of the objections to the tilting disc type of valve has been the necessity for frequently making the valve body or casing in a plurality of parts either welded or bolted together or else when the body has been made integral it has been necessary to remove the valve from the line itself when making repairs or replacements to the valve seats, discs, or the like.

Thus, it is one of the more important objects of this invention to provide a valve preferably with a one-piece body construction, in which the finishing or machining in the body is reduced to a minimum.

Another object is to provide for a valve construction in which the valve seat and also the disc or closure member may be easily removed and replaced without taking the valve body or casing out of the pipeline and thus avoids costly pipe joint severances.

A further important object of this invention is to provide for a valve construction in which the valve disc and the seat are also easily assembled, inspected, tested, and reassembled outside of the valve body, without affecting the latter member.

Another object is to provide for a type of valve construction in which replacement of a new internal operating unit, that is a new seat and disc or closure combination, for example, may be applied economically and in a relatively short period of time.

A further object is to provide for a seat and disc construction in which the novel means of attachment within the valve body need not necessarily be removed during the course of effecting the inspection or repair of the valve seat and disc.

Other objects and advantages will become more readily apparent upon proceeding with a reading of the specification, read in light of the accompanying drawings, in which:

Fig. 1 is a sectional assembly view of a preferred embodiment of our invention.

Fig. 2 is a fragmentary sectional view of a modified form of the attaching means therefor.

Fig. 3 is a sectional view taken on line 3—3 of Fig. 2.

Fig. 4 is a sectional assembly view of a further modified means of attachment embodying our invention.

Fig. 5 is a fragmentary sectional view of a still further modified exemplification of our inveniton, pertaining to the attaching means.

Fig. 6 is a fragmentary sectional view of another form of a modified means of attachment.

Fig. 7 is a fragmentary sectional view taken on the line 7—7 of Fig. 6.

Similar reference numerals refer to similar parts throughout the several views.

Referring now to Fig. 1, a casing or valve body, generally designated 1, is shown in fragmentary section, with the usual fluid inlet 2 and the flanges for attachment to a pipeline. Obviously, at the downstream end, as at 4, similar flanges (not shown) are employed for purpose of attachment to a pipeline. At the central portion of the body 1, the valve chamber 5 is provided for receiving the body seat ring 6. It will be noted that the chamber 5 at one side, as at 7, is provided with a finished or otherwise machined annular surface 7 upon which the oppositely disposed annularly finished surface 8 of the seat ring 6 is placed in abutting relation to make a fluid sealing contact therebetween, as shown. It will be noted that the body seat ring 6 is provided with a port 9, substantially in axial alignment with the respective inlet and outlet ports 2 and 4 of the valve casing 1, and is mounted so as to interrupt the port 9 upon actuation by pressure of the valve closure member or disc 11. The latter member is tiltably mounted upon the hinge pin 12, the valve disc 11 having the seating surface 13 annularly disposed as indicated for registry to make fluid sealing contact with the annular seat 14 when the valve closure member is in the position indicated by the dotted lines.

It will, of course, be apparent that in order to prevent valve leakage outwardly into the chamber 5 when the valve is in the closed position indicated, it is necessary that the surface 8 of the body seat ring be retained firmly and fluid tight against the surface 7 of the valve casing 1. This is preferably accomplished in an effective manner by having annularly arranged on an upper annular portion of the body a series of machine bolts 15 threadedly engaging the valve seat ring 6 as shown. Preferably, for purpose of attachment and operating the recessed or Allenhead portion 16 of the screw 15, the body is provided with complementary openings at 17 registering in each case with the Allen-head socket 16, as indicated. Thus, it will be clear that upon removal of the threaded plug 18, an Allen-head wrench (not shown) may be inserted and applied to the socket 16 and by suitable rotation of the machine bolt 15, the head 19 will be caused to bear against the surface 21 of the valve chamber 5 and thus cause the surface 8 to bear against the surface 7 with greater load and increased tightness. At the opposite or lower end of the valve chamber 5, designated 22, that contained portion therewithin is provided with the integral stop lug 23 and upon which the body seat ring 6 is supported and positioned relative to the port 2.

In this lower annular portion of the seat ring 6, it will also be noted that a number of annularly arranged bolts 24 are provided with a head portion 25 provided with an Allen-head socket or recess 26, the body having the coinciding aperture 27 and normally closed by the threaded plug 28. However, a significant difference from the manner in which seating pressure is applied to the surface 8 abutting against the surface 7 of the body in this case the machine bolt 24 by tightening will bear against the body chamber surface 21 and thus cause the body seat ring 6 to be forced against the casing in leakproof relation. Obviously, the surface 21 need not necessarily be machined in order to provide for the type of joint as at 7 and 8, and thus it will become apparent by the mere removal of the plugs 18 and 28 respectively at top and bottom annular or arcuately extending portions of the annular areas of the casing and actuating of an inserted wrench the machine bolts 15 and 24 may easily be loosened and thereby cause the seat ring 6 to be lifted out through the upper portion of the chamber 5. Of course, it should be understood that while not shown, a cap member will bear against the surface 29 in fluid sealing relation therewith to ordinarily close the valve chamber 5 upon final assembly of the body seat ring 6 and the closure member 11 with the casing 1. It has been found that this construction is a relatively cheap and simple manner for effecting the assembly of the seat ring with the casing and at the same time it allows for an integral valve body or casing to be used.

Of course, it will be clear that other forms of attachment for the seat ring 6 may also be employed as shown, for example, in the modified form in Fig. 2. In this construction, while the upper portion of the connecting means may be that shown in Fig. 1, as by means of the bolts 15, in this modification at the lower annular or arcuate portion a fastening means for the seat ring 31 may be employed whereby the attaching member constitutes a bolt of the machine screw type 32 threadedly engaging the seat ring 6 as indicated and bearing against the surface 21 of the lower portion of the chamber 22. In this construction, a bolt 32 is provided with a shoulder 33 and a square head portion 34 for the usual wrench engagement and it will, of course, be apparent that the retaining member 35 serves also as a fluid sealing plug being received within the apertured portion 36 of the casing and is held in place by means of the annularly arranged bolts 37 and the flange 38, the collar 39 at its undersurface being applied in fluid sealing relation by means of a gasket 41 therebetween as indicated. It should be clear then that by merely loosening the bolts 37 and relieving the bolt load pressure of the flange 38 and the collar fluid pressure 39, the retaining member 35 having a recessed square, as at 42 (see Fig. 3), and with an opposite end portion 43 thereof for engagement by a wrench will upon suitable rotation cause the bolts 32 to be turned upon its threads and thus bear against the surface 21. In this construction, of course, it will be clear that merely upon turning the retaining member 35 to loosen the bolt 32 the open side portion of the square recess 42 will allow for the easy transverse movement of the ring 31 and permit the latter member to be lifted out through the upper open portion of the chamber 5 without requiring the removal of the machine screw 32 or calling for a special wrench for the actuation of the said machine screw. This arrangement is specially helpful in large valves or where bolt renewal is difficult due to cramped space requirements.

In the still further modified form as shown in Fig. 4, the valve casing 1 is provided with the usual receiving chamber 5 for reception of the body seat ring 6. However, in this construction, a conventional open end wrench may be used to tighten the machine screws or bolts 43 threadedly engaging the seat ring 6 as indicated and thereby allowing the head 44 to abut the surface 21 of the chamber 5. The lower end portion of the chamber 5 at the designated chamber end 22, is provided with the annularly arranged threaded caps 45. The latter members are employed to contain an Allen-head wrench 46 non-rotatably engaging the recessed head 47 of the machine screw 48, the latter bearing against the body surface 21 as shown and previously described in connection with the other figures. In this construction, of course, it will be apparent that the wrench 46 is therefore always available upon removal of the cap so as to be easily used for tightening or loosening the machine screw 48.

In a still further modified form, as shown in Fig. 5, one or more conventional machine bolts may be employed, threadedly engaging the seat ring 6 as illustrated. In this structure, however, the hollow cap 51 upon removal allows for access to the head 50 and attachment of a conventional wrench to accomplish the tightening or loosening of the seat ring 6 as previously described.

In this structure, of course, it will be apparent that the entire bolt assembly is preferably removed before the ring member 6 is moved transversely outwardly and upwardly through the valve chamber opening 5 of the casing.

In a still further modified form of construction, as shown in Fig. 6, the machine screws 52 are used, bearing in the usual manner against the body chamber surface 21 of the casing 1 being provided with the head 47 recessed to provide an Allen-head socket. But in this modified structure, the casing is provided with compound plug member forming the fluid pressure retaining closure. It consists of the bushing 53 which is receivable within the aperture 54 of the casing and having at its threaded end a similarly threaded cap 55 for compressing a gasket at 56. The bushing is hexagonally or otherwise polygonally formed as shown more clearly in the section of Fig. 7 at 57 and is held against rotation by means of the oppositely disposed ribs 58 and 59 integral with the casing. Thus, in this structure, it will be clear that by merely loosening the threaded cap 55 from the threads of the bushing 53, the cap 55 may be easily removed and an Allen-head wrench, for example, inserted into the socket 26 of the head 47 for rotating machine screw 52 in the desired direction to cause the fluid tight joint between the surfaces 7 and 8 as described in connection with the other figures. The member 53 under such circumstances normally remains within the body chamber loosely between the ribs 58 and 59 of the casing.

While, of course, several embodiments have been shown and described in connection with setting forth the invention, it should be obvious that many other modified constructions may be used falling within the purview of the appended claims.

We claim:

1. A valve structure comprising a one piece casing having a substantially straight flow passage and a transversely extending fluid chamber intersecting said flow passage, said chamber being open at the top and closed at the bottom, removable means for covering the top of the chamber in fluid tight relation, an insert member freely and unrestrictedly introducible within the fluid chamber when the covering is off and substantially filling the fluid chamber in the longitudinal flow passage extending direction of the valve structure when in mounted relation within the fluid chamber, said insert member having a substantially straight flow passage for registry with the flow passage of the casing when the member is mounted within the fluid chamber, said insert member being provided with a seat surface and a closure member for engagement with the seat surface, said closure member being pivotally mounted within the flow passage of the insert member, means for mounting said insert member within the fluid chamber when the flow passage thereof is in registry with the flow passage of the casing comprising spaced means within the insert member adapted to bear against a single surface within said fluid chamber whereby to force the insert member against an opposite surface of the fluid chamber in fluid sealed relation therewith, said spaced means cooperating with said insert member for this action and being operative upon rotation therewithin, said casing having openings in the wall of the fluid chamber thereof in substantial alignment with at least some of the spaced means when the insert member is in fluid registry position relative to the flow passage of the casing to permit rotation of these spaced means from exterior of the casing, and means normally covering these openings in substantial fluid tight relation with the casing, said spaced means being arranged in spaced apart relation around the periphery of said insert member.

2. The subject matter of claim 1, said spaced means being removable with the said insert member upon loosening of the means from contact with the said single surface within the fluid chamber and movement of the insert member transversely from the fluid chamber after removal of the means covering chamber.

3. A check valve structure comprising a casing, said casing being of one piece integral construction having a substantially straight flow passage, said flow passage being intersected by a transversely extending chamber, said chamber extending at an angle substantially less than 90 degrees relative to the flow passage, said chamber having an open top and removable means for covering the opening in fluid tight relation, said chamber having a pair of flat parallel surfaces adjacent to and extending around said flow passage, the lower part of said chamber being defined by arcuate surface means substantially at right angles to said parallel surfaces, the portion of said casing having said chamber extending farther from the flow passage at the bottom on the upstream side than on the downstream side and presenting an outer surface of similar inclination to that of the chamber and parallel surfaces, a one-piece substantially flat insert member receivable within the said chamber of the casing, said insert member having a flow passage for registry with the interrupted flow passage of the casing in mounted relation and adapted to effect relatively stream lined fluid flow with the said flow passage of the casing, said insert member being provided with an integral annular valve seat which when the run of the valve is horizontally disposed is inclined at an angle nearer the horizontal than the angle of inclination of the intersecting chamber and parallel surfaces thereof, a swinging closure member pivotably supported within said insert member and adapted to drop by gravity in the absence of line pressure in the forward direction and to engage said valve seat in fluid sealing engagement upon development of back pressure, said closure member being automatically withdrawn with the supporting insert member upon removal of the latter transversely from mounted position through the top of the said chamber upon removal of the covering means, a plurality of means threadedly received within said insert member, said threaded means being arranged around the periphery of said insert member outwardly of the flow passage of the latter, each of said threaded means extending at right angles to the angle of inclination of the aforesaid chamber and parallel surfaces thereof, the threaded means in the upper part of said insert member being inserted from the downstream side while the threaded means in the lower part of the insert member being inserted from the upstream opposite side, the former threaded means extending only partly within the said insert member and each including an outer end portion adapted to be rotated and further adapted to abut against the downstream parallel surface of the chamber upon rotation whereupon to force the opposite side of the insert member against the upstream parallel surface of the chamber in fluid sealed metal to metal contact by screw action when the threaded means are rotated in the direction of withdrawal from the insert member, the latter upstream inserted threaded means being received within openings extending entirely through said insert member, said latter means each having a portion at the upstream end adapted to be rotated and a portion at the opposite downstream end adapted to abut against the downstream parallel surface upon rotation of the rotatable end portion whereupon to force the opposite side of the insert member against the upstream parallel surface of the chamber by screw action when the latter threaded means are rotated in the direction of further insertion within the insert member, the portion of the casing having the chamber being provided with openings axially aligned with each of the said latter threaded means when the insert member is in fluid registry position relative to the flow passage of the casing to permit rotation of the latter threaded means from exterior of the casing and means for enclosing the latter openings so as to effectively seal the same against substantial loss of internal fluid, each of the former and latter threaded means being rotatable in the opposite direction to that required for mounting of the insert member to permit loosening and transverse removal of the insert member and supported valve closure from the chamber, the thickness of the insert member being appreciably less than the width of the said chamber to facilitate such removal while still substantially filling the fluid chamber in the longitudinal flow passage extending direction of the valve structure when in mounted relation so as to produce a substantially uninterrupted flow passage through the entire device.

References Cited in the file of this patent

UNITED STATES PATENTS

| | | |
|---|---|---|
| 542,417 | Lenhart | July 10, 1895 |
| 551,011 | Turnbull | Dec. 11, 1895 |
| 663,275 | Hopkinson | Dec. 4, 1900 |
| 747,005 | Sieben | Dec. 15, 1903 |
| 831,141 | Cash | Sept. 18, 1906 |
| 1,572,033 | Parker | Feb. 9, 1926 |
| 1,785,138 | Mohler | Dec. 16, 1930 |
| 1,925,392 | LaBour | Sept. 5, 1933 |
| 2,130,652 | Robeson | Sept. 20, 1938 |
| 2,578,076 | Kirby | Dec. 11, 1951 |